US006919714B2

(12) United States Patent
Delepaut

(10) Patent No.: US 6,919,714 B2

(45) Date of Patent: Jul. 19, 2005

(54) CIRCUIT FOR CONDITIONING A SUPPLY AT THE MAXIMUM POWER POINT

(75) Inventor: Christophe Delepaut, Dilbeek (BE)

(73) Assignee: Alcatel (FR)

( * ) Notice: Subject to any disclaimer, the term of this patent is extended or adjusted under 35 U.S.C. 154(b) by 166 days.

(21) Appl. No.: 10/628,409

(22) Filed: Jul. 29, 2003

(65) Prior Publication Data

US 2004/0124816 A1 Jul. 1, 2004

(30) Foreign Application Priority Data

Aug. 9, 2002 (FR) .......................................... 02 10 140

(51) Int. Cl.[7] ........................... G05F 1/40; H01M 10/44

(52) U.S. Cl. ....................... 323/284; 323/285; 323/906; 320/149; 320/161

(58) Field of Search ................................ 323/266, 275, 323/284, 285, 288, 299, 906; 320/102, 149, 161, 162

(56) References Cited

U.S. PATENT DOCUMENTS

| | | | | |
|---|---|---|---|---|
| 5,530,335 A | | 6/1996 | Decker et al. | |
| 5,932,994 A | | 8/1999 | Jo et al. | |
| 6,204,645 B1 | * | 3/2001 | Cullen | 320/102 |
| 6,844,739 B2 | * | 1/2005 | Kasai et al. | 323/284 |

FOREIGN PATENT DOCUMENTS

| | | |
|---|---|---|
| EP | 0 027 405 A1 | 4/1981 |
| FR | 2 626 689 A1 | 8/1989 |
| FR | 2 819 653 A1 | 7/2002 |

OTHER PUBLICATIONS

J. Gow et al, "A Modular DC–DC Converter and Maximum Power Tracking Controller For Medium to Large Scale Photvoltaic Generating Plant", 8$^{th}$ Europeaan Conference On Power Electronics and Applications, Lausanne, CH, Sep. 7–9, 1999, vol. Conf. 8; pp, 1–8, XP00883026.

D. J. Caldwell et al, "Advanced Space Power System with Optimized Peak Power Tracking" Aerospace Power Systems, Conversion Technologies, Boston, Aug. 4–9, 1991, Proceedings of the Intersociety Energy Conversion Engineering Conference, NY/ANS/IEE< US, vol 2 Conf. 26, Aug. 4, 1991, pp. 145–150, XP000280495.

C. Hua et al, "Control of DC/DC Converters for Solar Energy System with Maximum Power Tracking", Proceedings of the IECON '97: 23$^{RD}$ International Conference On Industrial Electronics, Control, and Instrumentation, New Orleans, Nov. 9–14, 1997, vol. 2, Nov. 9, 1997, pp. 827–832, XP000898581.

* cited by examiner

*Primary Examiner*—Jessica Han
(74) *Attorney, Agent, or Firm*—Sughrue Mion, PLLC

(57) ABSTRACT

A circuit for conditioning a power supply whose graph of the power supplied as a function of the voltage at the terminals of the supply features a maximum comprises a DC/DC converter with an input to which power is supplied by the power supply and an output from which power is supplied to a load. A control circuit controls the converter in accordance with a power set point applied to the converter. The set point is a rising set point when the time derivative of the converter input voltage is higher than a negative first threshold value and a falling set point when the time derivative of the converter input voltage is lower than a positive second threshold voltage. The rate of variation of the average power when the set point is a rising set point is lower than the opposite of the rate of variation of the average power when the set point is a falling set point. The conditioning circuit enables the supply to deliver power at the maximum power point and is simple to implement.

18 Claims, 2 Drawing Sheets

CIRCUIT FOR CONDITIONING A SUPPLY AT THE MAXIMUM POWER POINT

CROSS-REFERENCE TO RELATED APPLICATIONS

This application is based on French Patent Application No. 02 10 140 filed Aug. 9, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to power supplies and more precisely to the operation of power supplies which feature a maximum on the curve of the power supplied as a function of the voltage at the terminals of the supply.

2. Description of the Prior Art

For the above kind of supply, the power supplied is at a maximum when the voltage has a given value. For optimum operation of the power supply—to draw the maximum power therefrom—it is beneficial for the voltage at the terminals of the supply to be as closely equal to the aforementioned given value as possible.

The solar generators used for satellites constitute one example of the above kind of power supply. FIG. 1 is a graph of the current and the power as a function of the voltage at the terminals of the generator for a generator formed of a series connection of 102 back surface reflector (BSR) Si cells; cells of the above kind are available in the aerospace industry. The current in amperes supplied by the solar generator and the power delivered by the generator in watts are plotted on the ordinate axis; the voltage in volts at the terminals of the generator is plotted on the abscissa axis. The curves 1 and 2 in FIG. 1 correspond to operation at a temperature of +100° C. and the curves 3 and 4 correspond to operation at a temperature of −100° C. The curve 2 in FIG. 1 is a graph of the current as a function of voltage and shows that the current supplied by the cells falls when the voltage exceeds a value of the order of 35 V, which is caused by saturation of the cells; the curve 4 is similar, except that the saturation voltage is of the order of 75 V. The curve 1 in FIG. 1 is a graph of the power supplied by the solar generator and shows that the power supplied has a maximum value in the example of the order of 100 W which is achieved for a value V0 of the voltage that is of the order of 38 V. The curve 3 is similar to the curve 2, with maximum power and voltage V0 values of the order of 200 W and 70 V, respectively. These curves constitute only one particular example of a generator in which the graph of the power supplied as a function of the output voltage features a maximum.

When using the above kind of solar generator, or more generally the above kind of power supply, it is beneficial for the voltage at the terminals of the supply to be as close as possible to the value V0 of the voltage at which the supply delivers maximum power. This problem is particularly acute in the case of solar generators used on satellites. For these solar generators, the voltage V0 at which the generator supplies the maximum power varies as a function of the temperature of the generator, as shown in FIG. 1, and the voltage V0 also varies as a function of:

- the intensity of the solar radiation to which the generator is exposed, and
- aging of the generator.

The temperature of a satellite typically varies within a range from −100° C. to +100° C. in the case of a satellite in low Earth orbit, for example. For a Mercury orbit, the temperature variation is even greater, and the temperature can vary over a range from −150° C. to +250° C. The intensity of the solar radiation can vary as a function of the distance from the Sun; for a mission from the Earth to Mars, the intensity of the solar radiation can vary in a ratio from 3 to 1. Aging of the generator short circuits some cells. Overall, the voltage V0 can typically vary in a ratio from 1 to 2, for example from 40 V to 80 V.

It has therefore been proposed, in order to extract maximum power from them, to operate solar generators in such a way as to have the voltage at the terminals of the generator close to the voltage V0. The techniques for achieving this are known generically as maximum power point tracking.

W. Denzinger, *Electrical Power Subsystem of Globalstar, Proceedings of the European Space Power Conference*, Poitiers, France, 4–8 Sept. 1995, describes the power subsystem of the Globalstar satellites. The maximum power point is determined by considering it to have been reached when the dynamic impedance of the generator is equal to the static impedance, in other words when:

$$V/I=dV/dI$$

that is to say when:

$$dI/I=dV/V$$

Strictly speaking, VI=max implies VdI+IdV=0 and thus V/I=−dV/dI. Denzinger forgets the − sign.

The above document describes a circuit using a current sensor, a voltage sensor, two sampling circuits, two comparators, a bistable and an integrator.

Kevin Kyeong-II Choi and Alphonse Barnaba, *Application of the maximum power point tracking (MPPT) to the on-board adaptative power supply subsystem*, CNES technical memorandum No. 138, Jul. 1998, describes an electrical power supply subsystem for low-power satellites. For maximum power point tracking, this subsystem uses a microcontroller associating digital multiplication of the current by the intensity and an algorithm for tracking the power on the basis of the calculated values.

These solutions are complex to implement. They lead to centralizing control of maximum power point tracking of the various solar generators, and this centralization affects the reliability of the electrical power supply subsystem and is incompatible with maximum power points at different voltages in different sections of the solar generator. Furthermore, these solutions use the direct components of the currents and/or voltages, which are not characteristic of maximum power point tracking.

This problem, explained here with reference to satellite solar generators, arises more generally for any power supply whose graph of the power supplied as a function of voltage features a maximum.

There is therefore a requirement for a solution for operating a power supply so that the curve of the power supplied as a function of the voltage at the terminals of the supply features a maximum. Such a solution should, using means that are as simple and as rugged as possible, ensure that the voltage at the terminals of the power supply is as far as possible as close as possible to the voltage at which the maximum power is supplied.

SUMMARY OF THE INVENTION

Consequently, one embodiment of the invention provides a circuit for conditioning a power supply whose graph of the power supplied as a function of the voltage at the terminals of the power supply features a maximum, the circuit comprising a DC/DC converter with an input to which power is supplied by the power supply and an output from which power is supplied to a load and a control circuit for controlling the converter in accordance with a power set point applied to the converter, which set point is a rising set point when the time derivative of the converter input voltage is higher than a negative first threshold value and a falling set point when the time derivative of the converter input voltage is lower than a positive second threshold voltage, the rate of variation of the average power when the set point is a rising set point being lower than the opposite of the rate of variation of the average power when the set point is a falling set point.

The first threshold value and/or second threshold value is/are advantageously constant. The first and second threshold values can then be opposite.

In one embodiment the rising power set point applied to said converter is a constant positive time derivative of the power.

In another embodiment the falling power set point applied to said converter is a constant negative time derivative of the power.

The constant positive derivative can be less than the opposite of the constant negative derivative.

The invention also proposes a conditioned generator comprising the above conditioning circuit and a power supply whose graph of the power supplied as a function of the voltage at the terminals of the power supply features a maximum, and wherein the power supplied by the power supply is applied to the input of the DC/DC converter.

In one embodiment the generator includes a capacitor which shunts the power supply. The supply can also have an intrinsic capacitance. The power supply is advantageously a solar generator.

The invention finally proposes a method of conditioning a power supply whose graph of the power supplied as a function of the voltage at the terminals of the supply features a maximum, in which method the power supplied by the supply is applied to a DC/DC converter, the method comprising the application to the converter of an input power set point that is a rising set point when the time derivative of the converter input voltage is higher than a negative first threshold value and a falling set point when the time derivative of the converter input voltage is lower than a positive second threshold voltage and the rate of variation of the average power when the set point is a rising set point is lower than the opposite of the rate of variation of the average power when the set point is a falling set point.

The first threshold value and/or the second threshold value can be constant. The first and second threshold values can then be opposite.

The rising power set point applied to the converter is advantageously a constant positive time derivative of the power or a constant negative time derivative of the power. In this case, the constant positive derivative can be less than the opposite of the constant negative derivative.

Other features and advantages of the invention will become apparent on reading the following description of an embodiment of the invention, which description is given by way of example and with reference to the accompanying drawings.

DETAILED DESCRIPTION OF THE PREFERRED EMBODIMENT

The remainder of the description gives one example of the application of the invention to maximum power point tracking in a solar generator. As explained above, this kind of generator is merely one example of a power supply whose graph of the power supplied as a function of the voltage at the terminals of the supply features a maximum.

Figure 2:
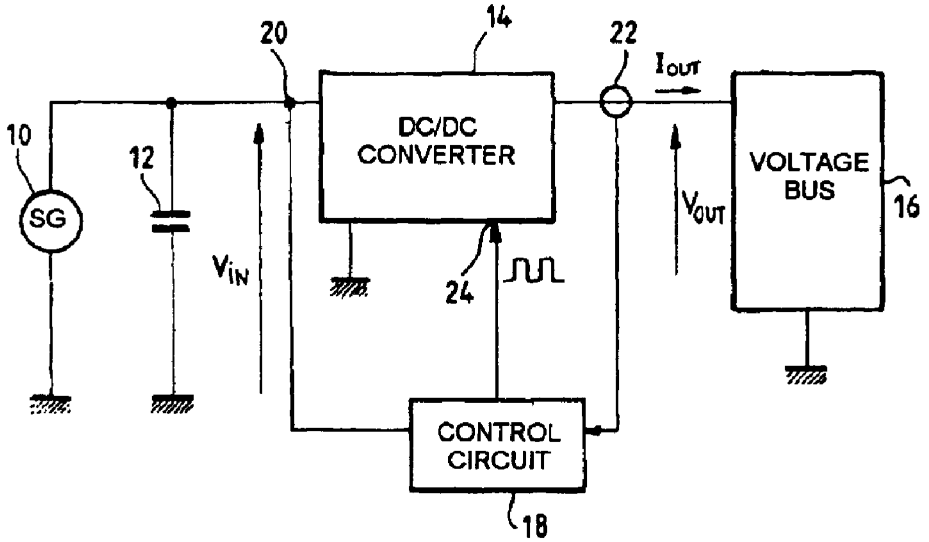
FIG. 2 is a diagrammatic representation of one embodiment of a conditioned generator according to the invention.

FIG. 2 is a diagrammatic representation of one embodiment of a conditioned generator according to the invention, in an application of supplying power to a satellite voltage bus. The conditioned generator comprises a solar generator 10 and a conditioning circuit. The conditioning circuit enables the conditioned generator to deliver power at a fixed voltage, in other words to behave as a voltage supply, if the power delivered is less than the maximum power that the solar generator can supply, although the solar generator is able only to supply a variable power, up to the maximum power available, at varying voltages.

The figure shows the solar generator 10—the power supply—which is connected in parallel with a capacitor 12. The voltage Vin at the terminals of the solar generator and the capacitor is applied to the input of a DC/DC converter 14. This representation of the supply, the capacitor and the converter is schematic; in fact, a solar generator has an inherent capacitance and the converter can also have an input capacitance. The capacitor 12 is not necessarily a component separate from the generator and the converter, but can consist of the capacitance of the generator and/or the converter. The capacitor 12 can also consist of the combination of the inherent capacitance of the solar generator, an additional capacitor, and a capacitance of the converter.

The voltage Vout at the output of the converter 14 is matched to the voltage bus 16 of the satellite, which usually includes a battery supplying power to the loads, but this does not alter the operation of the circuit.

The converter 14 is controlled by a control circuit 18. The control circuit 18 receives at its input the input voltage Vin applied to the converter and the current Iout at the output of the converter; the figure shows the voltage sensor 20 and the current sensor 22 diagrammatically. The control circuit supplies a control signal that is applied to the control input of the converter 14, as shown at 24 in the figure.

As explained above, the power supplied by the solar generator 10 is a function of the voltage Vin at the terminals of the generator; the voltage for which the power supplied is at a maximum can vary in a range [V0min, V0max], in this example a range from 40 V to 80 V. A standard solution is for the voltage bus of the satellite to operate at a nominal voltage of 28 V, in which case the voltage varies from 23 V to 37 V as a function of the load and the power supplied to the voltage bus. In practice, the nominal voltage of the bus is lower than the lower limit V0min of the range in which the voltage at which the maximum power is supplied varies. In a configuration of this kind, the converter 14 can be a Buck pulse width modulation (PWM) converter, which is particularly suitable when the output voltage is lower than the input voltage. In this case, the input signal is a signal representative of the pulse width modulation duty cycle.

The control circuit 18 controls the converter 14 by applying a rising or falling output current set point based on the measured input voltage Vin and the measured output current Iout of the converter. These current set points are similar to power set points except for the factor of proportionality that consists of the bus voltage value. To be more precise, the control circuit applies to the converter a rising power set point when the time derivative of the voltage extracted from the solar generator 10 and the capacitor 12 at the input of the converter is above a negative first threshold value. The control circuit applies a falling power set point to the converter when the time derivative of the voltage extracted from the solar generator 10 and the capacitor 12 at the input of the converter is below a positive second threshold value. The converter is therefore controlled so that:

$$\frac{dP_{IN}}{dt} > 0$$

when:

$$\frac{dV_{IN}}{dt} > V'_r$$

where $V'_r$ is the negative first threshold value and $P_{in}$ is the power extracted from the supply and the capacitor, in other words the power applied to the input of the converter. The converter is controlled so that:

$$\frac{dP_{IN}}{dt} < 0$$

when:

$$\frac{dV_{IN}}{dt} < V'_f$$

where $V'_f$ is the positive second threshold value.

The solutions of W. Denzinger and Kevin Kyeong-Il Choi referred to hereinabove propose using direct current and/or voltage components, which are not characteristic of maximum power point tracking. Conversely, the solution proposed by the invention uses only the time derivatives of those quantities, and these time derivatives are highly characteristic of maximum power point tracking, regardless of the direct component values.

Figure 3:
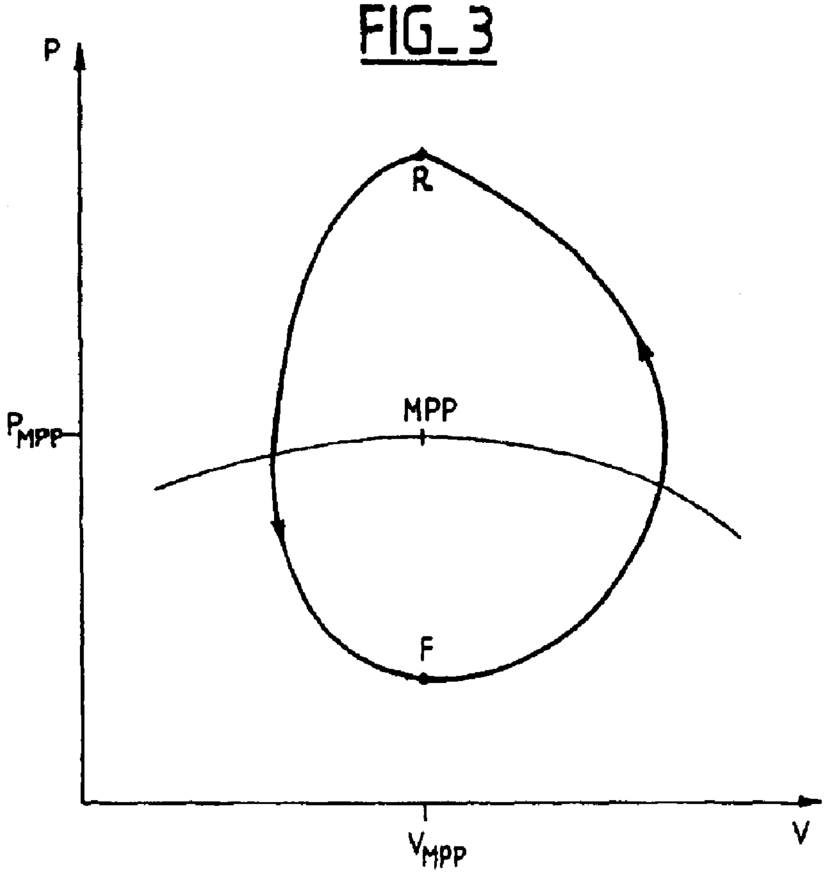
FIG. 3 is a graph for the conditioned generator shown in FIG. 2 of the power delivered by the power supply as a function of the voltage at its terminals.

FIG. 3 is a graph of the power delivered by the solar generator as a function of the voltage at the terminals of the generator. The power supplied by the solar generator 10 is plotted on the ordinate axis and the voltage at the terminals of the generator is plotted on the abscissa axis. The figure shows in thin line the curve of the power delivered by the solar generator 10 as a function of the voltage at its terminals, which features a maximum power point MPP at which, for a voltage $V_{MPP}$, the solar generator delivers a maximum power $P_{MPP}$. This thin line curve might be called the static power curve in that it is representative of a power/voltage characteristic of the solar generator in isolation. FIG. 3 shows in thick line the power cycle when the control signals defined above are applied to the converter. The thick line curve shows the power extracted from the combination of the solar generator 10 and the capacitor 12.

In the present example there are:

a rising power set point having a constant derivative $k_r$, a falling power set point having a constant derivative $k_f$, and opposite threshold values $V'_r$ and $V'_f$.

The first two conditions are chosen to simplify the explanation and the third condition ensures operation around static maximum power points, as explained later. In the figure, the points R and F are the points on the cycle corresponding to the maximum and minimum dynamic powers.

It is assumed initially that the solar generator operates at a power slightly lower than the maximum power $P_{MPP}$ and that the voltage is greater than the voltage $V_{MPP}$. It is also assumed that the set point applied to the converter is a rising power set point. The DC/DC converter therefore ensures that the total power extracted from the solar generator 10 and capacitor 12 rises. The operating point of the solar generator 10 moves along the thin line curve toward the maximum power point MPP and the capacitor 12 is discharged to top up the power supplied by the solar generator 10. The voltage falls slowly.

When the maximum power of the solar generator 10 is reached, the solar generator 10 cannot supply additional power and the capacitor 12 is then discharged more rapidly to provide the power required by the converter, when the rising power set point applies. This increases the rate at which the voltage $V_{IN}$ falls; because this voltage falls, the power supplied by the solar generator 10 also falls, which further accentuates the discharging of the capacitor 12. The time derivative of the voltage $V_{IN}$ also falls more and more rapidly.

When the derivative of the voltage $V_{IN}$ reaches the negative threshold $V'_f$, the circuit 18 applies to the converter 14 a falling power set point. The changeover corresponds to the point R on the thick line curve.

The converter then receives a falling input power set point. Initially, the voltage falls, with a slower variation, and the capacitor 12 continues to discharge. As the power extracted from the supply and the capacitor continues to fall, there comes a time when the capacitor ceases to discharge, which corresponds on the thick line curve to the intersection of the left-hand portion of the curve with the thin line curve and to the minimum voltage. The power extracted from the solar generator 10 is then sufficient to supply the power required by the converter 14. As the set point applied to the converter is still a falling power set point, the capacitor is charged and the voltage rises again; because of the falling power set point applied to the converter, the power extracted from the converter continues to fall. As the voltage rises, the power supplied by the solar generator tends to rise, which further increases the time derivative of the voltage.

When the time derivative of the voltage exceeds the positive second threshold value, the control circuit supplies a rising power set point to the converter to return to the initial state considered above.

When a constant power derivative set point is applied, stable control is ensured by applying the condition:

$$k_r < -k_f$$

Figure 1:
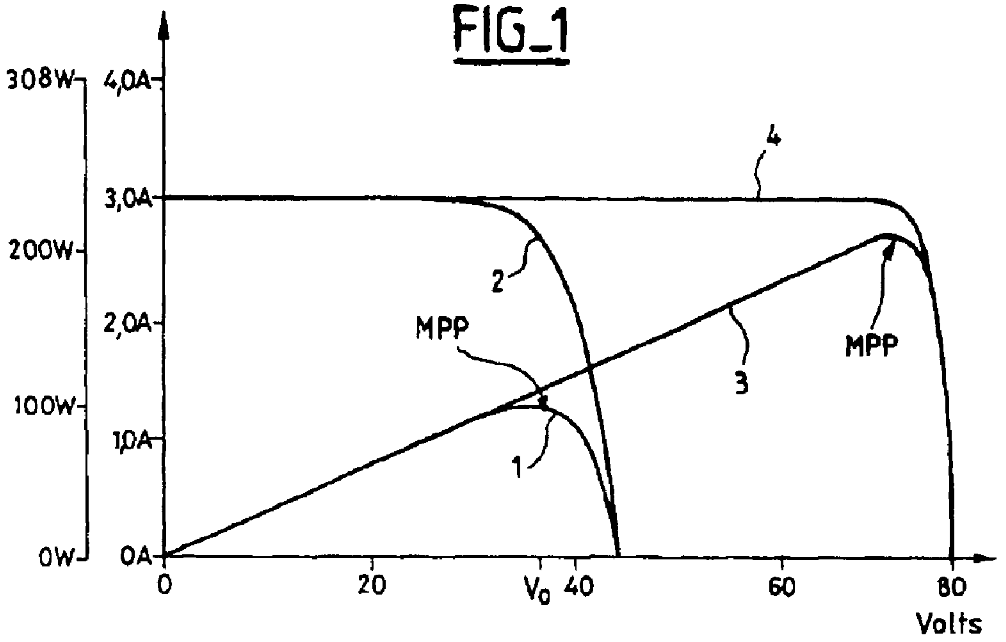
FIG. 1 is a graph of current and power as a function of the voltage at the terminals of a power supply to which the invention applies.

Intuitively, this amounts to saying that the movement along the thick line curve in FIG. 3 from the point R to the point F is "faster" than the movement from the point F to the point R. In other words, as explained above, the negative dV/dt threshold is reached with the voltage falling faster and faster; the condition $k_r < -k_f$ means that a "moderately" rising power set point is applied to return quickly to a stable situation. A ratio of 1 between the absolute values corresponds to the limit of stability. The choice of a value depends essentially on the converter: moving toward a ratio of 1 imposes the provision of a converter with more accurate performance, and increases the cost. In satellite applications, the variations in the curve for the solar generator of power as a function of voltage (the change from curves 1 and 2 to curves 3 and 4) in FIG. 1, and likewise the rates of variation of the characteristics of the battery constituting the load of the conditioned circuit, are slow and therefore do not generally condition the ratings of the system. Typically a ratio $-k_f/k_r$ close to 2 can be selected, for example with:

$k_r$=50 W/ms, and $k_f$=−100 W/ms.

Figure 4:
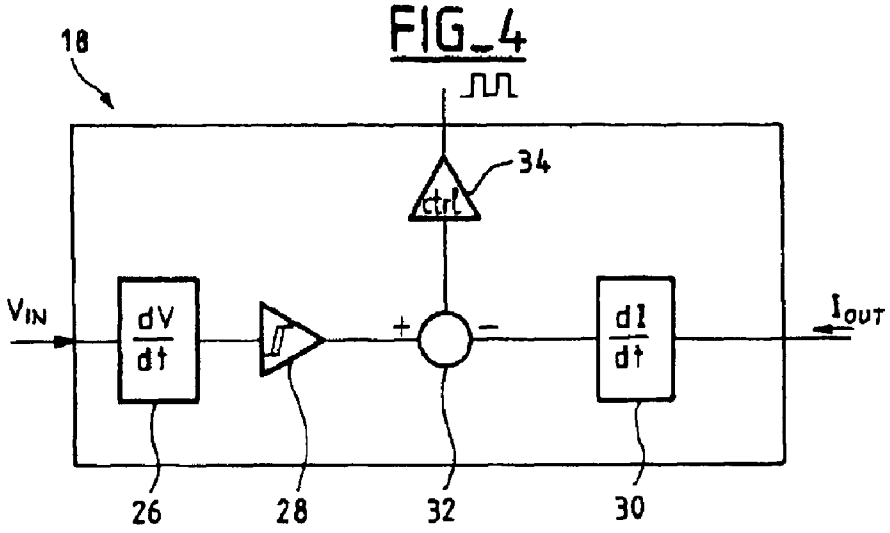
FIG. 4 is a more detailed view of the control circuit of the conditioned generator shown in FIG. 2.

It will be noted that operation as described above is independent of the value of the rising or falling power set point applied to the converter. As shown in FIG. 4, it is simpler to use constant power set point values, but this has no effect on the converter control principle. If the proposed power set points are not constant, in other words, if the values of $dP_{IN}/dt$ applied to the converter are not constant, the stability condition can be expressed by indicating that the rate of variation of the average power when the set point is rising is less than the opposite of the rate of variation of the average power when the set point is rising. This amounts to generalizing over the rising and falling power set point time intervals the instantaneous condition $k_r<-k_f$.

Applying the proposed set points to the DC/DC converter therefore varies the voltage around the voltage value at which the maximum power is extracted from the solar generator 10. The choice of the set point values applied as threshold values to the converter adapts the operation of the conditioning circuit.

To be more specific, it is simpler, from the point of view of implementing the control circuit, to have constant threshold values $V'_r$ and $V'_f$. This merely facilitates the design of the control circuit. These threshold values could nevertheless be varied as a function of time, for example to take account of variations in the MPP.

The ratio of the absolute values of the threshold values $V'_r$ and $V'_f$ determines the point on the graph of the power as a function of the voltage around which the above movements occur. In the above example, constant and opposite threshold values $V'_r$ and $V'_f$ correspond to movement around the maximum power point MPP. An absolute value ratio of 1 is therefore advantageous. However, other values can be chosen, which simply move the operating point away from the maximum power point. This can be advantageous with respect to other constraints on the conditioning circuit or on the generator.

FIG. 4 shows an embodiment of the control circuit in the case of a Buck converter. The circuit 18 includes a differentiator 26 which receives the input voltage of the converter and supplies its derivative. The derivative of the voltage is supplied to a comparator 28. The output of the comparator provides a logic signal whose state depends on the comparison between the derivative of the voltage and the threshold values $V'_r$ and $V'_f$ of the comparator. The circuit includes another differentiator 30 which receives the output current signal of the converter and supplies its derivative. An adder 32 supplies a signal representative of the difference between the signal from the comparator 28 and the derivative supplied by the second differentiator 30 to a controller 34 whose function is to cancel out the set point. The output signal of the controller forms the output signal of the control circuit 18.

The FIG. 4 circuit operates in the following manner. The comparator supplies at its output a signal that is a function of the position of the derivative of the converter input voltage relative to the threshold values $V'_r$ and $V'_f$ and is compared to the derivative of the output current of the converter following a scaling operation that is not shown in the figure. This derivative of the output current constitutes a good approximation of the derivative of the power applied to the input of the converter, because:

- the power consumed by the DC/DC converter is low, and
- the output voltage of the converter is substantially constant, in that the converter is operated as a voltage supply.

As a function of the result of comparing $dV_{IN}/dt$ with the threshold values, the controller assures that $dI_{out}/dt<0$ or $dI_{out}/dt>0$ (in a ratio less than −1). With $V_{OUT}$ substantially constant, the required set point is obtained.

The FIG. 4 circuit is merely one example of a control circuit that can be used for the DC/DC converter. Other types of control circuit can also be used to compare the derivatives of the voltages and to apply the required set points. Sensors other than the FIG. 2 sensors 20, 22 can also be provided. The circuit of FIGS. 2 and 4 nevertheless has the advantage of simplicity; thus there is no need to provide a microcontroller; the component count is as low as in the solution proposed in the above paper by W. Denzinger.

Of course, the invention is not limited to the examples described above. Thus a Buck converter has been mentioned, suited to the situation of an output voltage lower than the input voltage. Other types of converters can also be used; for example, a Boost PWM converter can be used if the input voltage is lower than the output voltage. Other converter topologies also allow operation when the ratio between the input voltage and the output voltage varies around 1. The type of converter used does not change the control principle as described with reference to FIG. 3.

There is claimed:

1. A circuit for conditioning a power supply whose graph of the power supplied as a function of the voltage at the terminals of said power supply features a maximum, said circuit comprising a DC/DC converter with an input to which power is supplied by said power supply and an output from which power is supplied to a load and a control circuit for controlling said converter in accordance with a power set point applied to said converter, which set point is a rising set point when the time derivative of the converter input voltage is higher than a negative first threshold value and a falling set point when the time derivative of said converter input voltage is lower than a positive second threshold voltage, the rate of variation of the average power when said set point is a rising set point being lower than the opposite of the rate of variation of the average power when said set point is a falling set point.

2. The circuit claimed in claim 1 wherein said first threshold value is constant.

3. The circuit claimed in claim 1 wherein said second threshold value is constant.

4. The circuit claimed in claim 1 wherein said first and second threshold values are constant and opposite.

5. The circuit claimed in claim 1 wherein said rising power set point applied to said converter is a constant positive time derivative of the power.

6. The circuit claimed in claim 1 wherein said falling power set point applied to said converter is a constant negative time derivative of the power.

7. The circuit claimed in claim 1 wherein said rising power set point applied to said converter is a constant positive time derivative of the power, said falling power set point applied to said converter is a constant negative time derivative of the power, and said constant positive derivative is less than the opposite of said constant negative derivative.

8. A conditioned generator comprising a conditioning circuit as claimed in claim 1 and a power supply whose graph of the power supplied as a function of the voltage at the terminals of said power supply features a maximum, and wherein the power supplied by said power supply is applied to the input of said DC/DC converter.

9. The generator claimed in claim 8 wherein a capacitor shunts said power supply.

10. The generator claimed in claim 9 wherein said power supply is a solar generator.

11. The generator claimed in claim 8 wherein said supply has an intrinsic capacitance.

12. A method of conditioning a power supply whose graph of the power supplied as a function of the voltage at the terminals of said supply features a maximum, in which method the power supplied by said power supply is applied to a DC/DC converter, said method comprising the application to said converter of an input power set point that is a rising set point when the time derivative of the converter input voltage is higher than a negative first threshold value and a falling set point when the time derivative of said converter input voltage is lower than a positive second threshold voltage and the rate of variation of the average power when said set point is a rising set point is lower than the opposite of the rate of variation of the average power when said set point is a falling set point.

13. The method claimed in claim 12 wherein said first threshold value is constant.

14. The method claimed in claim 12 wherein said second threshold value is constant.

15. The circuit method in claim 12 wherein said first and second threshold values are constant and opposite.

16. The circuit claimed in claim 12 wherein said rising power set point applied to said converter is a constant positive time derivative of the power.

17. The circuit claimed in claim 12 wherein said falling power set point applied to said converter is a constant negative time derivative of the power.

18. The circuit claimed in claim 12 wherein said rising power set point applied to said converter is a constant positive time derivative of the power, said falling power set point applied to said converter is a constant negative time derivative of the power, and said constant positive derivative is less than the opposite of said constant negative derivative.

* * * * *